United States Patent
Hoffelmeyer et al.

(10) Patent No.: US 6,735,486 B2
(45) Date of Patent: May 11, 2004

(54) SIDE LOAD DETECTION AND PROTECTION SYSTEM FOR ROTATABLE EQUIPMENT

(75) Inventors: Richard L. Hoffelmeyer, St. Joseph, MO (US); Harlan H. Henke, St. Joseph, MO (US); Steven L. Jones, St. Joseph, MO (US)

(73) Assignee: Altec Industries, St. Joseph, MO (US)

( * ) Notice: Subject to any disclaimer, the term of this patent is extended or adjusted under 35 U.S.C. 154(b) by 451 days.

(21) Appl. No.: 09/846,977

(22) Filed: May 1, 2001

(65) Prior Publication Data

US 2002/0165628 A1 Nov. 7, 2002

(51) Int. Cl.$^7$ .................................................. G05B 9/02
(52) U.S. Cl. ..................... 700/80; 700/204; 701/50; 212/278; 212/277; 212/279
(58) Field of Search .................. 700/80, 204; 212/278, 212/279, 277; 701/50

(56) References Cited

U.S. PATENT DOCUMENTS

| | | | | |
|---|---|---|---|---|
| 4,100,843 A | | 7/1978 | Dietrich et al. | 493/317 |
| 4,236,408 A | | 12/1980 | Corry | 73/152.43 |
| 4,532,595 A | * | 7/1985 | Wilhelm | 701/124 |
| 4,752,012 A | | 6/1988 | Juergens | 212/278 |
| 5,160,055 A | * | 11/1992 | Gray | 212/278 |
| 5,163,570 A | | 11/1992 | Mundis et al. | 212/278 |
| 5,557,526 A | * | 9/1996 | Anderson | 701/50 |
| 6,173,573 B1 | * | 1/2001 | Kamada | 60/422 |
| 6,202,013 B1 | * | 3/2001 | Anderson et al. | 701/50 |

* cited by examiner

Primary Examiner—Ramesh Patel
Assistant Examiner—Thomas Pham
(74) Attorney, Agent, or Firm—Hovey Williams LLP

(57) ABSTRACT

A side load detection and protection system (10) operable using pressure sensors (26, 28) to determine side load as a function of a difference in media pressure between two ports (40, 42) of a pneumatic/hydraulic rotation motor (22). When the side load exceeds a pre-established limiting value, the system (10) shuts off functions that could be causing the side load. The system (10) includes a visual display (34) to communicate the actual amount of side load and to present a warning when the limiting side load value has been reached or exceeded. The system (10) is able to differentiate between loads applied to the rotation mechanism through operation of the pneumatic/hydraulic rotation motor (22) and loads due to external forces acting directly or indirectly on the system (10). Furthermore, in order to account for different efficiencies, the system (10) can have separate set-points for side load in clockwise or counterclockwise directions.

23 Claims, 2 Drawing Sheets

SIDE LOAD DETECTION AND PROTECTION SYSTEM FOR ROTATABLE EQUIPMENT

BACKGROUND OF THE INVENTION

1. Field of the Invention

The present invention relates to systems for detecting and protecting against undesired side loads on rotatable equipment, such as may be applied to the booms of mobile cranes. In particular, the present invention relates to systems using pressure sensors to detect excessive side load and shut off appropriate equipment functions in response thereto.

2. Description of the Prior Art

It is frequently desirable to detect and protect against excessive torques on rotatable equipment, such as caused by undesirable side loads applied to the boom ends of mobile crane-like devices commonly known as "digger derricks". Such rotatable devices are designed to accommodate limited and predictable controlled loads. Unpredictable side loads on the boom can occur during various types of operations, including winching a load from the side or screwing an anchor at an angle into the ground with a digger. Excessive side loads can cause substantial damage to the equipment's structure and operating mechanisms.

Several systems exist for protecting against excessive side loads. These systems typically attempt to sense undesired load levels and respond with appropriate action when pre-established limits are exceeded. For example, one existing system uses relief valves that open when pressure increases in a hydraulic motor due to back driving under excessive side load torque. Pressure relief allows the booms to slip toward the load, thereby reducing the side load torque. However, boom slippage does not work well in all situations (i.e., working on excessive slopes).

Another existing system translates thrust loads on an internal worm drive shaft into hydraulic pressure and then disables load-related functions using a preset hydraulic pressure switch. This latter system, however, does not compensate for different mechanical efficiencies between the clockwise and counterclockwise directions of rotation because the system utilizes a single common pressure setting. Furthermore, an undesirably large amount of hysteresis can occur between the actuation and reset values.

SUMMARY OF THE INVENTION

The side load detection and protection system of the present invention includes enabling technology that overcomes the disadvantages of existing systems to make the monitoring and mitigation of torques or side loads applied to rotatable equipment more reliable, and operation of the equipment more predictable. The preferred system determines side load as a function of the difference in media pressure between two ports of a pneumatic/hydraulic rotation motor. When the side load reaches or exceeds a pre-established limiting value, the system shuts off equipment functions likely to be causing or contributing to the side load. The system includes a visual display to communicate the amount of actual side load and to communicate a warning when the side load limit has been reached or exceeded.

The system is able to differentiate between loads applied to the rotation mechanism through operation of the pneumatic/hydraulic rotation mechanism and external side loads applied to the boom creating an excessive torque. Furthermore, in order to account for different efficiencies, the system can be adjusted for different threshold settings in the clockwise and counterclockwise directions.

These and other important aspects of the present invention are more fully described in the section entitled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
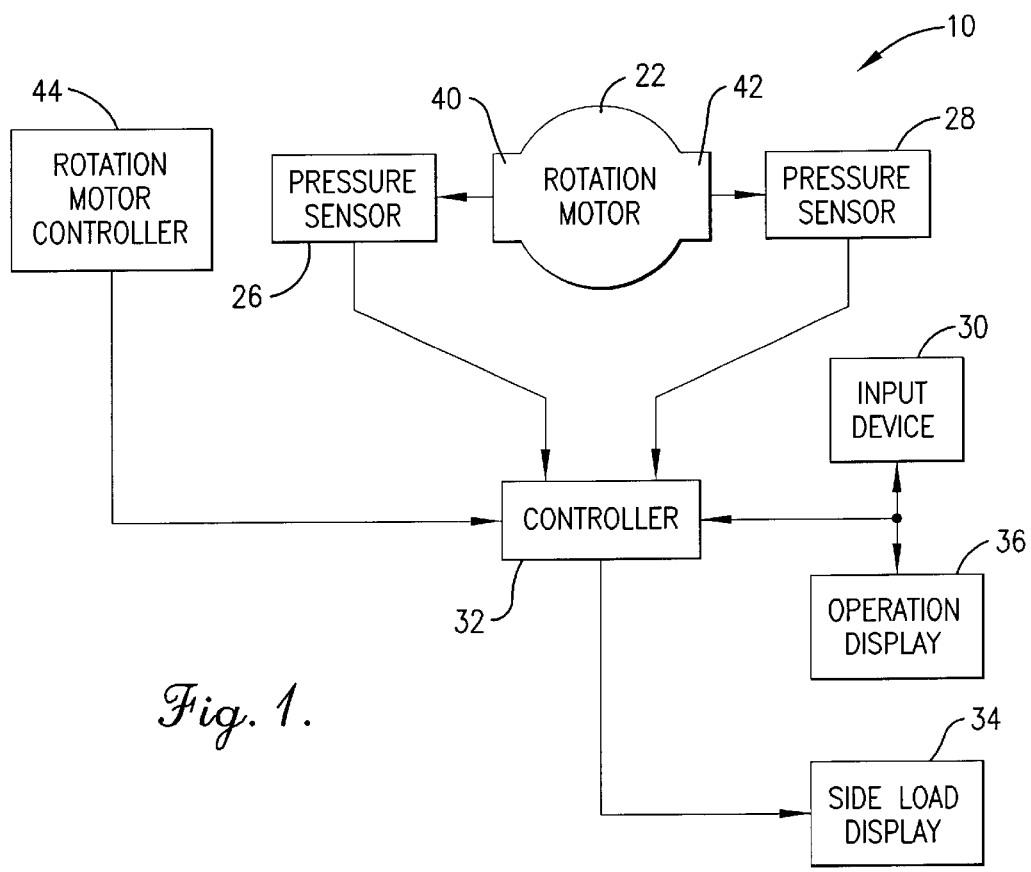
FIG. 1 is a block diagram of the major components of a preferred embodiment of the side load detection and protection system of the present invention.

FIG. 1 shows a side load detection and protection system 10 constructed in accordance with a preferred embodiment of the present invention and operable to monitor side loads applied to rotatable equipment and to protect against structural and internal damage caused by excessive side load. The protection system 10 may be used with any pneumatic/hydraulic rotatable equipment subject to side loads, such as digger derricks or other boomed apparatuses.

Figure 2:
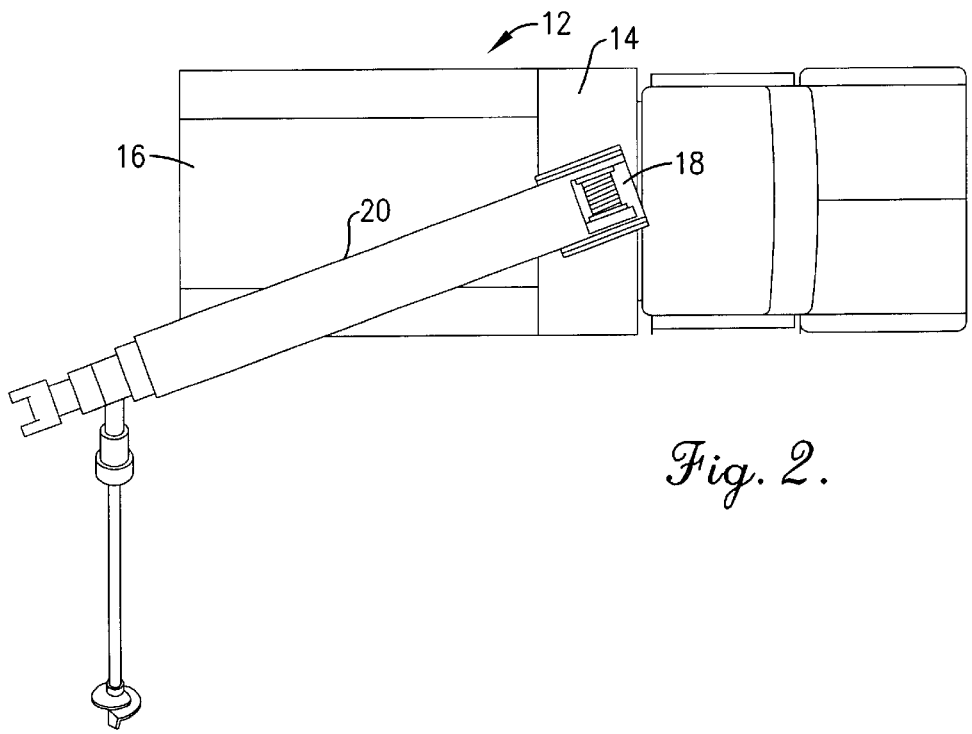
FIG. 2 is a top plan view of a digger derrick to which the present invention has application.

Referring also to FIG. 2, a digger derrick 12 is shown operable to perform a variety of functions, including, for example, digging holes for utility poles and installing earth or screw anchors for supporting the poles once erected. The digger derrick 12 is shown only for reference and does not limit the present invention which has broad application to a variety of rotating systems. The digger derrick 12 broadly comprises a frame 14 mounted on a truck bed 16 that rotatably supports a turntable 18. An elongated boom 20 extends outwardly from and rotates with the turntable 18. The turntable 18 and boom 20 are rotatably driven by a pneumatic/hydraulic rotation motor 22 (see FIG. 1). The rotation motor 22 delivers rotational force to the turntable through conventional drive linkage.

The preferred detection and protection system 10 is shown broadly comprising first and second pressure sensors 26,28; an input device 30; a controller 32; a side load display 34; and an operation display 36. The system 10 is shown monitoring first and second pneumatic/hydraulic pressure ports 40,42 of the rotation motor 22. The pressure ports 40,42 are part of a flowpath for a pressurized pneumatic or hydraulic media. A rotation motor controller 44 is also shown operable to engage and disengage the rotation motor 22.

The first and second pressure sensors 26,28 are positioned and operable to convert media pressures at the ports 40,42 to electrical signals indicative of the magnitudes of the media pressures which, in turn, correspond to the amount of side load transmitted via the equipment's structure to the rotation motor 22. The pressure sensors 26,28 preferably provide 0.5–4.5 V signal output for media pressures between 0–3000 psi.

The input device 30 is operable to communicate set-point values to the controller 32 which define the limiting amount of side load torque that may be applied to the rotatable equipment. The input device 30 is preferably a membranous keypad or switchpad. The input device 30 is also operable to communicate to the controller 32 the direction of rotation, whether clockwise or counterclockwise, associated with each set-point value, thereby allowing the system 10 to compensate for different directional efficiencies.

The controller 32 is operable to receive the electrical signals produced by the sensors 26,28, and the set-point value and other information communicated by the input device 30, and a motor control signal generated by the rotation motor controller 44, and determine whether any side load exceeds the applicable set-point value. The controller 32 is preferably a microprocessor, such as is available, for example, from Microchip Technologies, but may alternatively be any suitable device, including varieties of microcontrollers. Actual side load is calculated as a function of the difference in the magnitudes of the pressures sensed by the sensors 26,28; excessive side load exists when the actual side load exceeds the appropriate set point value. The controller 32 is further operable to generate control signals to drive the displays 34,36, provide warnings, and shut off equipment functions, depending on the results of the side load determination.

As will be appreciated by those with skill in the relevant arts, the rotation mechanism may be subject to a variety of side load-inducing operating conditions depending, for example, upon the nature of the rotation mechanism 22; related structures driven by the rotation mechanism 22, such as booms, winches, and augers; and the nature of and conditions in which work is being performed. For these reasons, the system 10 preferably allows for a number of independently adjustable pre-established set points, with each such set point being associated with one of the side load-inducing operating conditions. Thus, the system 10 is easily adaptable to provide side load detection and protection under a variety of conditions.

The side load display 34 communicates a visual indication of the amount of side load present, if any, and presents a visual or audible warning when the controller 32 determines that the side load has exceeded the pre-established set point. A warning is also presented when side load protection is disabled during operation of the rotation function. The display 34 is preferably an analog meter with an indicator light, but may be any device, including a light emitting diode (LED) display or liquid crystal display (LCD), capable of displaying or otherwise communicating the information.

The operation display 36 is preferably located near the input device 30 and is operable to communicate, using one or more LEDs, input data or diagnostic system information including malfunctions such as failure of one of the pressure sensors 26,28.

Figure 3:
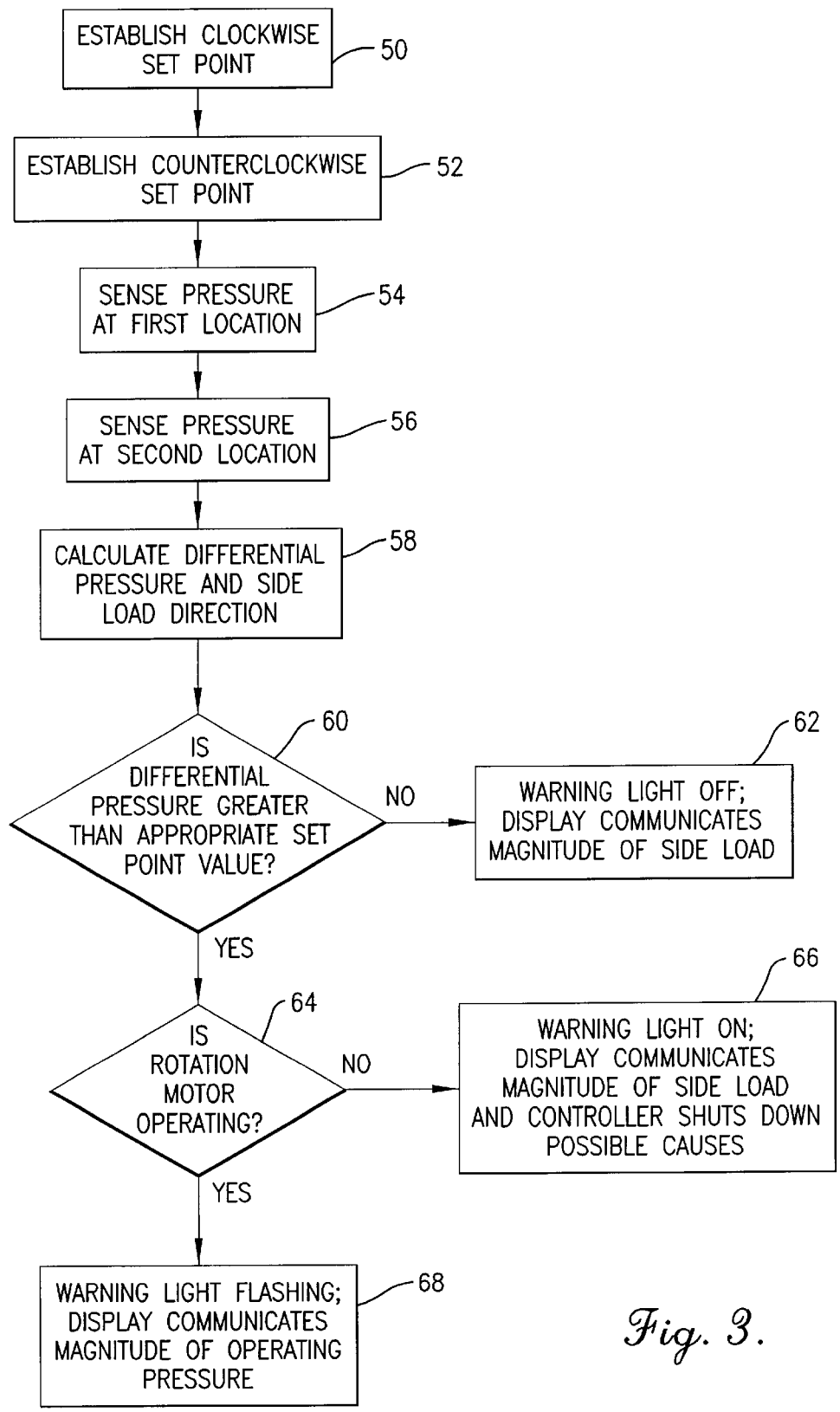
FIG. 3 is a flowchart of the operation of a preferred embodiment of the side load detection and protection system of the present invention.

Referring also to FIG. 3, the operation, use, and calibration of the detection and protection system 10 is illustrated. Initially, as depicted by boxes 50 and 52, the manufacturer or maintenance personnel of a piece of rotatable equipment (such as the derrick digger 12) establishes the set-point values defining the side load limits for the equipment in each direction of rotation and for particular operating conditions. The set-point values are changeable by the manufacturer or maintenance personnel during a calibration process, which allows the system 10 to be adapted for use on different equipment models. Once these values are set, no adjustment should be required but for maintenance purposes.

As depicted by boxes 54 and 56, the pressure sensors 26,28 produce electrical signals representing the magnitudes of the media pressures at the ports 40,42. As depicted by box 58, the controller 32 receives these signals and determines the amount and direction of side load applied to the boom as a function of the difference between port pressures. As depicted by box 60, the controller 32 then compares the differential port pressure to the appropriate pre-established set-point in order to determine whether excessive side load exists. If the differential pressure is below the set-point, the controller 32 drives the side load display 34 to communicate the corresponding amount of side load to the operator, as depicted by box 62.

If the differential pressure equals or exceeds the set-point, and the rotation mechanism is not operating, the controller 32 drives a visual or audible warning, as depicted by boxes 64 and 66, to indicate the overload condition, and shuts down, via electronic relays (not shown), the hydraulic valves associated with operations likely to be contributing to the overload condition, including winching, digging, or screwing.

Due to effects of efficiencies within the rotation system, the differential pressure required to turn the rotation motor 22 and rotate the boom 20 at a given torque about the axis of rotation is typically higher than the differential pressure induced when an external side load is imposed on the boom 20. Thus, differential pressure arising during operation of the rotation mechanism may routinely need to exceed the set-point though side load on the boom 20 does not exceed the side load limit. Therefore, if the measured differential pressure equals or exceeds the set-point for the corresponding direction of rotation while the rotation mechanism is being operated, as depicted by boxes 64 and 68, the controller 32 will drive an intermittent visual or audible warning via the side load display 34 indicating that the system 10 is temporarily disabled. The side load display 34 will also visually communicate the amount of media differential pressure utilized to operate the rotation motor 22.

The operator can determine whether the system 10 is functioning properly by referring to the operation display 36 which communicates system malfunctions. Maintenance personnel can utilize the operation display 36 to diagnose such conditions as failure of the controller 32 or one of the pressure sensors 26,28.

From the preceding description, it can be seen that the side load detection and protection system provides increased monitoring of and protection against structural and internal damage caused by excessive side load applied to rotatable pneumatic/hydraulic systems.

Applications are contemplated for the detection and protection system herein described that require only minor modifications to the system as disclosed. Thus, although the invention has been described with reference to the preferred embodiment illustrated in the attached drawings, it is noted that equivalents may be employed and substitutions made herein without departing from the scope of the invention as recited in the claims. For example, the controller may, where desirable and practical, be implemented using a microprocessor, microcontroller, or other electronic device operable to perform the required functions.

Having thus described the preferred embodiment of the invention, what is claimed as new and desired to be protected by Letters Patent includes the following:

What is claimed is:

1. A side load detection and protection system for use with rotatable systems subject to undesired side loading, the rotatable system having a rotation mechanism driven by a pressurized media flowing along a flow path, the side load monitoring system comprising:

a first pressure sensor operable to generate a first load signal corresponding to a first magnitude of the media pressure at a first location within the flow path;

a second pressure sensor operable to generate a second load signal corresponding to a second magnitude of the media pressure at a second location within the flow path; and a controller operable to calculate the amount of side load as a function of the difference between the first load signal and the second load signal, to determine whether the side load exceeds a first pre-established limiting side load value, and, if so, to communicate a warning, and to determine whether the side load exceeds a second pre-established limiting side load value, which is different from the first pre-established limiting side load value, and, if so, to communicate the warning.

2. The side load detection and protection system as set forth in claim 1, the media being a gas.

3. The side load detection and protection system as set forth in claim 1, the media being a fluid.

4. The side load detection and protection system as set forth in claim 1, wherein the controller comprises a microcontroller.

5. The side load detection and protection system as set forth in claim 1, further including a keypad for changing the pre-established limiting side load value.

6. The side load detection and protection system as set forth in claim 1, wherein the controller comprises a differential amplifier.

7. The side load detection and protection system as set forth in claim 1, wherein the controller is further operable to regulate potential causes of excessive side load.

8. The side load detection and protection system as set forth in claim 1, wherein the rotation mechanism is subject to both clockwise side load and counterclockwise side load, with the clockwise direction and counterclockwise direction each being associated with an independently adjustable pre-established limiting side load value, wherein each limiting side load value is different.

9. The side load detection and protection system as set forth in claim 1, wherein the rotation mechanism is operable to rotate in a clockwise direction and a counterclockwise direction, with the clockwise rotation and the counterclockwise rotation each being associated with an independently adjustable pre-established limiting side load value, wherein each limiting side load value is different.

10. The side load detection and protection system as set forth in claim 1, wherein the rotation mechanism is subject to a variety of side load-inducing operating conditions, with each such operating condition being associated with an independently adjustable pre-established limiting side load value.

11. The side load detection and protection system as set forth in claim 1, further including an input device for changing the pre-established limiting side load value.

12. The side load detection and protection system as set forth in claim 1, further comprising a visual display controlled by the controller and operable to communicate the amount of side load.

13. A method of determining whether excessive side load is acting upon a rotatable system, the rotatable system having a rotation mechanism driven by a pressurized media flowing along a flow path, the method comprising the steps of:

(a) generating a first load signal corresponding to a first magnitude of the media pressure at a first location within the flow path;

(b) generating a second load signal corresponding to a second magnitude of the media pressure at a second location within the flow path;

(c) establishing a limiting side load value;

(d) determining the amount of side load as a function of the difference between the first load signal and the second load signal; and (e) comparing the amount of side load to the established limiting side load value to produce a comparison result, the comparison result being indicative of whether excessive side load is acting upon the rotatable system.

14. The method as set forth in claim 13, wherein the rotation mechanism is subject to both a clockwise side load and a counterclockwise side load, and step (c) includes establishing a first limiting side load value for the clockwise side load and a second limiting side load value for the counterclockwise side load wherein the first limiting side load value is different from the second limiting side load value.

15. The method as set forth in claim 13, wherein the rotation mechanism is operable to rotate in a clockwise direction and a counterclockwise direction, and step (c) includes establishing a first limiting side load value for the clockwise direction and a second limiting side load value for the counterclockwise direction wherein the first limiting side load value is different from the second limiting side load value.

16. The method as set forth in claim 13, wherein the rotation mechanism is subject to a variety of side load-inducing operating conditions, and step (c) includes establishing an independently adjustable limiting side load value for each such operating condition.

17. The method as set forth in claim 13, further comprising the step of (f) communicating the amount of side load.

18. The method as set forth in claim 13, further comprising the step of (f) communicating a warning when the comparison result indicates excessive side load.

19. The method as set forth in claim 13, further comprising the step of (f) regulating potential causes of excessive side load when the comparison result indicates excessive side load.

20. A method of determining whether excessive side load is acting upon a rotatable system, the rotatable system having a rotation mechanism driven by a pressurized media flowing along a flow path, the method comprising the steps of:

(a) generating a first load signal corresponding to a first magnitude of the media pressure at a first location within the flow path;

(b) generating a second load signal corresponding to a second magnitude of the media pressure at a second location within the flow path;

(c) establishing a maximum side load value relating to an undesired maximum side load for the rotatable system;

(d) determining the amount of side load as a function of the difference between the first load signal and the second load signal; and (e) comparing the amount of side load to the established maximum side load value to produce a comparison result, the comparison result being indicative of whether excessive side load is acting upon the rotatable system.

21. The method as set forth in claim 20, wherein the rotation mechanism is subject to both a clockwise side load and a counterclockwise side load, and step (c) includes establishing a first maximum side load value for the clockwise side load and a second maximum side load value for the counterclockwise side load wherein the first maximum side load value is different from the second maximum side load value.

22. The method as set forth in claim 20, wherein the rotation mechanism is operable to rotate in a clockwise direction and a counterclockwise direction, and step (c) includes establishing a first maximum side load value for the clockwise direction and a second maximum side load value for the counterclockwise direction wherein the first maximum side load value is different from the second maximum side load value.

23. The method as set forth in claim 20, wherein the rotation mechanism is subject to a variety of side load-inducing operating conditions, and step (c) includes establishing an independently adjustable maximum side load value for each such operating condition.

* * * * *